2,830,044
DICHLORODIFLUOROETHYL ETHER OF CELLULOSE ESTERS AND LOWER ALKYL ACETALS

Jürgen Smidt, Munich-Solln, and Paul Ernst and Joseph Kalteis, Burghausen, Germany, assignors to Consortium für Elektrochemische Industrie G. m. b. H., Munich, Germany, a corporation of Germany No Drawing. Application February 17, 1955
Serial No. 488,992

Claims priority, application Germany October 22, 1954

4 Claims. (Cl. 260—226)

This invention relates, generally, to synthetic plastic substances of the type that may be shaped by molding, casting or the like, and that may be used, also, for or as a component of coating compositions, for or as a component of an impregnating composition, especially as an impregnant for electrical equipment and the like, and for other like uses. More particularly, the novel plastics of this invention are fluorine-containing ether-type derivatives of certain polymeric polyhydroxy organic substances, having properties outstandingly characteristic of fluorine-containing polymers while also exhibiting desirable properties characteristic of cellulose derivatives and related types of plastics.

It is known that important plastic products may be derived from cellulose by esterifying one or more of the three hydroxyl groups, and that these derivatives are soluble in organic solvents, thus permitting easy production of films and filaments of the plastic substance. Nitrates were the first cellulose esters to be of technical importance and three chief types are recognized: celluloid pyroxylin, containing 10.5% to 11% nitrogen and being soluble in ethanol-ether mixtures and in absolute ethanol; soluble pyroxylin, containing 11.5% to 12.3% nitrogen and being soluble in absolute ethanol; and guncotton, containing 12.5% to 13.5% nitrogen and being substantially insoluble in alcohol-ether mixtures and in absolute ethanol. All commercial cellulose nitrates are soluble in acetone and in the low-molecular weight aliphatic esters. By calculation, it is evident that cellulose dinitrate should contain 11.11% of nitrogen and the trinitrate, 14.5% nitrogen, but the products of commerce merely approximate these analyses and, hence, must be recognized as being mixtures rather than pure compounds.

Cellulose nitrates once were widely used, at first as celluloid, a mixture of celluloid pyroxylin and camphor, which easily may be molded under moderate pressures into sheets and other objects, and, later, in lacquers which, because of ease of application, rapid drying and durability, gained widespread use, both in industry, especially in automobile body finishing, and in home decoration. The extremely high inflammability of nitrocellulose lacquers, however, has created an industrial want for a substitute having their desirable properties without their disadvantages.

Another cellulose derivative of commercial importance is cellulose acetate which, like the cellulose nitrates, exists in three forms approximating the mono-, the di- and the tri-acetate of cellulose, depending upon the degree that the hydroxyl groups present are acetylated. The mono-ester, because of its insolubility in organic solvents, and the tri-ester, because it is soluble merely in expensive and/or highly toxic solvents, have been of lesser importance industrially than the diacetate, which is the usual cellulose acetate of commerce. Although more expensive to manufacture and, hence, to use, than cellulose nitrate, the lower inflammability of the acetate, its freedom from spontaneous decomposition, and its greater stability to discoloration have caused it largely to displace the nitrate for use in the manufacture of photographic film base, molded plastic articles and synthetic fibers, notably acetate rayon. Despite the advantages of cellulose acetate, a need was felt for a plastic substance retaining its advantages but which would be more resistant to alkalis, more compatible with gums and plasticizers, less permeable to water and less prone to absorb it, and more generally soluble in common organic solvents, especially cheap, halogen-free, organic liquids. To some measure, this need has been filled by cellulose-ether polymers, notably ethyl cellulose, which is a mixture of the three ethyl ethers in varying proportion depending upon the number of hydroxyl groups etherified.

It is known, also, that certain unsaturated organic compounds containing fluorine can be polymerized to yield valuable industrial products having outstanding, in some instances, unique properties. For instance, the fluorothene resins, produced by polymerization of chlorotrifluoroethylene, are mechanically strong plastics having unique resistance to action of high-temperatures and chemical agents, being resistant to temperatures as high as nearly 400° F. and being unaffected by strong caustics, acids, and powerful oxidizing agents such as aqua regia and fuming nitric acid. These polymers, moreover, are characterized by good resistivity and power factor values at high temperatures, and their water absorption values are so low as to be undetected by conventional test methods. Their range of dimensional stability is most exceptional, extending over a range of about 706° F. from a base of −332° F. to a maximum of +374° F.

The value of fluorothene resins for special end uses, such as in electric wire insulation for high temperature operation, vacuum tube sockets, printed circuits, battery cases and separators, valve seats, diaphragms and gaskets, heat transfer agents, high temperature solvents, and the like, has been explored experimentally and proved successful. Such applications, and the exceptional properties of fluorothene resins, have generated widespread interest in the chemical processing, electric power, electronics, packaging, textile, medical supply, radio and television industries concerning possible uses of these new materials. However, the exceptionally high present cost of these plastics—about the highest known for a commercially available plastic—together with certain technical difficulties in working these materials, have restricted their uses to instances where cost may be substantially disregarded, despite the obvious desirability of using them in other, more common, applications.

One of the principal objects of this invention is to provide novel synthetic plastic substances having the high-temperature resistance and low water absorption characteristics of fluorine-containing polymers, together with the desirable wide solubility, ease of manipulation and low cost that are characteristic of cellulose derivatives of the types mentioned above, without their characteristic disadvantages.

Another object of this invention is to provide a new plastic substance of the type aforesaid that is suited to use in the form of films, molded objects, filaments and the like, that are characterized by improved resistance to water permeation and absorption, and that retain their strength and dimensional stability when wet.

A further object of this invention is to provide a plastic substance having the valuable mechanical, physical, electrical and solubility properties characteristic of polymeric cellulose derivatives, and which, further, has the resistance to combustion and the relative non-inflammability that are characteristic properties of polymeric fluorine-containing substances.

Other objects of this invention will be apparent hereinafter.

Regarding the invention in certain of its broader aspects, it comprises certain novel plastic materials, produced by suitable treatment of a polymeric polyhydroxy organic chemical substance of the type represented by cellulose, polyvinyl alcohol and the like, whereby an appreciable proportion of the total hydroxy groups present in the polymeric molecule are etherified to the form of fluorine-containing alkoxy groups, and substantially all of the remaining hydroxy groups present are esterified, etherified or converted to acetal groups. Stated somewhat differently in terms, but identically in scope, the plastics of this invention are partial fluoroalkyl ethers of a polymeric polyhydroxy organic chemical substance of the type represented by cellulose, polyvinyl alcohol and the like, wherein substantially all of the remaining unetherified hydroxy groups present are replaced by acyloxy, alkoxy other than fluoroalkoxy, or acetal groups.

These novel compounds can be prepared by initially etherifying the selected polymeric polyhydroxy substance by reacting it with a selected fluoroalkene in an aqueous alkaline reaction medium, then converting the remaining hydroxy substituents to the desired ester, ether, or acetal groups by treatment with suitable reagents in the manner conventionally used when making these types of hydroxy-compound derivatives. It will be understood that, if desired, merely some of the remaining hydroxy groups may be etherified in this manner and substantially all of the further remainder may thereafter be converted to ester, ether or acetal groups, whereby the several types of substituent groups other than hydroxyl concurrently may appear in the same substance.

The terms fluoroalkyl, fluorine-containing alkoxy, fluoroalkoxy and fluoroalkene, as above employed, include designation of compounds or radicals of the mentioned general types wherein other halogen substituents, in addition to fluoro-substituents, may be present, as in dichlorodifluoroalkyl.

According to the presently preferred embodiment of this invention, the preferred polymeric polyhydroxy substance is cellulose, which is partially etherified to one or more or a mixture of its dichlorodifluoroethyl ethers by reaction with dichlorodifluoroethylene, and which, as a result of subsequent reactions, bears, additionally, substituents in the form of acetoxy or nitrate groups, substantially entirely substituting the remaining hydroxy groups. Specifically, the new plastics of this invention are dichlorodifluoroethyl ethers of cellulose nitrate or cellulose acetates.

The novel synthetic plastic substances according to this invention are characterized by resistance to combustion, by low moisture absorption and by relative non-inflammability, as are other fluorine-containing polymers, but, in contrast to such other polymers, these substances possess the properties of mechanical strength, together with other physical, electrical and solubility porperties that are characteristic of derivatives, especially the esters and ethers, of polymeric polyhydroxy substances. Indeed, the properties of the new materials, as regards chemical resistivity, especially against alkalis, tolerance for and compatibility with plasticizers, and certain electrical properties, show them to be superior to previously known polymeric polyhydroxy substance derivatives.

These new materials are readily soluble in cheap, commonly available organic solvents, including halogen-free organic liquids; they may be injection-molded or cast without significant modification of existing procedures; they may be made readily into films; and they may be made into filaments having outstanding wet strength by unmodified existing procedures.

Articles fabricated from these new plastics, whether in the form of films, filaments, molded objects or other shapes, are characterized by exceptional resistance to moisture absorption and by improved resistance to moisture permeation, thus making them especially suited to use under adverse weather conditions or under conditions of high humidity. Such articles, further, retain their strength and dimensional stability substantially unchanged even under these adverse conditions.

One of the advantages of the products according to this invention is that the properties of the plastics may be modified as desired, during manufacture, by adjustment of the balance of the various substituents present in the polymeric molecule. For example, the properties characteristic of fluorine-containing polymers can be emphasized by increasing the proportion of fluoroalkoxy substituents present, and the moisture absorption, even though low, is further reduced as a result of elimination of hydroxy substituents through etherification, esterification or the like.

It is remarkable that, in the manufacture of the plastics according to this invention by the methods above described, the high degree of polymerization of the starting material, the polymeric polyhydroxy substance, remains substantially unmodified after the initial etherification; thus, the final products have a high degree of polymerization that is recognized as a very desirable property in a polymer of this type and which has a significant bearing upon its properties, especially its stability.

The plastics according to this invention are particularly adapted to use as substitutes for existing types of plastics used in the manufacture of photographic film, both nitro-base film and safety film, for they combine, in an unexpected manner, the best properties of the conventional film base materials with the additional advantage of being substantially non-inflammable. Lacquers containing the new materials have remarkable water resistance and, as components of nitrocellulose lacquers, the new plastics serve to reduce combustibility.

It is to be emphasized that the cost of the new plastics according to this invention is low relative to the types of fluorine-containing polymers heretofore known, due. not only to the comparative cheapness and ready availability of the starting materials used in making these plastics, but due, also, to the simple, straight-forward manner of their manufacture.

To facilitate a fuller and more complete understanding of the subject matter of this invention, and of how the novel plastics in accordance therewith may best be prepared, certain specific examples herewith follow, but it is clearly to be understood that these examples are supplied by way of illustration, merely, and are not to be construed as being limitations on this invention as defined in the subjoined claims.

EXAMPLE 1

*Preparation of a dichlorodifluoroethyl ether of cellulose partial nitrate*

About 150 grams of clean cotton linters is mercerized by treatment with 720 grams of an aqueous solution of sodium hydroxide (ca. 26% by weight) for a period of about one hour at room temperature, the mixture being agitated throughout, for example, by using a rolling drum as the reaction vessel. The reaction product is then etherified by condensation with about 460 grams of dichlorodifluoroethylene, preferably in the presence of a small quantity of a wetting agent, for instance, about 0.6 gram of sodium isopropylnaphthalenesulfonate, which is offered commercially under the tradename "Nekal PX." At a reaction temperature of about 40° C., the condensation reaction is completed to a satisfactory degree after about 7½ hours, whereupon the excess dichlorodifluoroethylene that is still unreacted is removed from the reaction mixture by distillation and the reaction product, after being washed free of alkali, is air-dried at a temperature of about 60° to 80° C. It is found, upon analysis, that this product contains about 16% by weight of chlorine, representing a halogenoethoxy content of approximately 29% to 30% by weight or about 0.5 mole per mole of cellulose. This fuzzy, dry product then is nitrated by conventional methods to obtain the desired final product: about 4 grams of the partial ether prepared in the manner described is treated with a mixture of 100 grams orthophosphoric acid (83%), 144 grams of phosphorous pentoxide and 130 grams of nitric acid (65%), at room temperature for one hour in a closed vessel. The nitration product is removed from the reaction mixture by filtration, washed with water, neutralized by treatment with a dilute sodium carbonate solution, pressed out, and remaining water is washed out with methanol.

The dry product so obtained is a dichlorodifluoroethyl ether of cellulose partial nitrate, having a nitrogen content of about 12% by weight. It is soluble in the solvents of cellulose nitrate, compatible with conventional plasticizers, and it burns much less rapidly than a cellulose nitrate of equal nitrogen content. It is suitable for use as a component of lacquers and similar coating compositions.

If, instead of nitrating the partial ether intermediate product in the manner above described, it is nitrated with a mixture of 57 parts by weight of concentrated sulfuric acid (94%), 28 parts by weight of concentrated nitric acid (65%) and 15 parts by weight of water, at room temperature for a period of about one hour, the nitration product obtained has a nitrogen content of merely about 6%, although it is soluble in the common solvents of cellulose nitrate. In degree and kind, the solubility properties and compatibility of this product with plasticizers and softening agents, for instance, camphor, are identical with those of commercial grades of cellulose nitrate, although it is much less dangerous to handle and use, because of its reduced rate of combustion and lower inflammability. It is, therefore, particularly well suited as a cellulose nitrate substitute in applications where these properties are important, for example, in the manufacture of toys and the like, and in the manufacture of photographic film, especially movie film.

The following contrasted properties emphasize the similarities of the physical properties of the new plastic and nitrocellulose and the dissimiliarities of the behavior of the two substances on combustion. These data are results of a test performed on 70 micron thick films of a conventional commercial grade nitrocellulose, and of a dichlorodifluoroethyl ether of cellulose partial nitrate, containing about 6% nitrogen by weight, 24.4% ether groups and about 8.2% free or unreacted hydroxyl groups. Except where otherwise indicated, the tests were performed at ordinary room temperatures at a relative humidity of 65%.

|  | Fluoroethyl ether of cellulose partial nitrate film | Cellulose nitrate film |
| --- | --- | --- |
| Tensile strength (kilograms per square millimeter). | 8.5 | 8.7. |
| Elongation before rupture | 7.4% | 7.8%. |
| Number of alternate bendings before breaking. | 41 | 40. |
| Water absorption at 100% humidity (percent). | 3.1 | 4.4. |
| Combustibility when ignited in open air. | Requires an appreciable and measurable time to burn. | Burns explosively and instantaneously. |

EXAMPLE 2

*Preparation of a dichlorodifluoroethyl ether of cellulose partial acetate*

About 80 grams of the fuzzy, dry cellulose dichlorodifluoroethyl partial ether, prepared as described in Example 1, is placed in a suitable reaction vessel and approximately 800 cubic centimeters of glacial acetic acid is poured thereover, then the mixture is allowed to stand for about 12 hours at room temperature. About 400 cubic centimeters of catalyst solution, comprising 8 cubic centimeters of perchloric acid (70% by weight) and the remainder glacial acetic acid, is added to the acetylation mixture, the mass is well kneaded at room temperature and, after two hours, about 400 cubic centimeters of acetic anhydride is added and the mixture is slowly and carefully heated to a temperature of about 35° C. within a period of approximately 30 to 40 minutes. The mixture is maintained at this temperature until a clear solution forms and for about one half to one hour thereafter, whereby acetylation is substantially completed, then excess acetic anhydride in the mixture is hydrolyzed by addition of dilute acetic acid, water is added to cause precipitation of the reaction product, which is recovered, washed acid-free and dried in the conventional manner.

The product so obtained, a dichlorodifluoroethyl ether of cellulose partial acetate, upon analysis, is found to contain about 47% acetyl and 16% to 16.5% dichlorodifluoroethyl groups. It is soluble in solvents of cellulose triacetate, for example, in tetrachloroethane, ethylene chlorohydrin, and mixtures of methanol and methylene chloride. It is particularly suited for use as a substitute for cellulose acetate in manufacture of so-called safety or non-combustible types of photographic film and, because of its extraordinary ability, in films, to maintain its original dimensions, even when wet, it is especially adapted for use in the manufacture of X-ray and other special types of photographic films. These films may be produced in the usual manner, using the usual mixed solvents, for example, mixed methylene chloride and methanol, and proceeding as when making films of cellulose triacetate. The films produced in this manner have a tensile strength of about 9 to 10 kilograms per square millimeter, an elongation before rupture of approximately 14%, and, in comparison to cellulose triacetate films, which have a water absorption coefficient of 10 to 11%, they have outstandingly low water absorption, being about 3% to 4% without plasticizer and as low as less than 1% when a suitable plasticizer is used, such as one of the triaryl phosphates.

The following contrasted data are results of tests applied to films of a commercially available grade cellulose triacetate and of a dichlorodifluoroethyl ether of cellulose partial acetate, substantially free of hydroxyl groups and containing about 47.2% acetyl and about 16.4% dichlorodifluoroethyl groups by weight, prepared as above described, using films having a thickness of 70 microns. Except where otherwise indicated, the tests were performed at ordinary room temperatures and at a relative humidity of about 65%.

|  | Fluoroethyl ether of cellulose partial acetate film | Cellulose triacetate film |
| --- | --- | --- |
| Tensile strength (kilograms per square millimeter) | 8.9 | 9.7 |
| Elongation before rupture percent | 14.2 | 4.0 |
| Number of alternate bendings before breaking | 14 | 13 |
| Water absorption at 100% humidity (percent) | 3.6 | 10.9 |
| Break-down potential (kilovolts per millimeter) | 110–125 | 120–130 |

EXAMPLE 3

*Preparation of a partial dichlorodifluoroethyl ether of cellulose partial acetate*

The procedure described in Example 2 is repeated through the operations whereby acetylation is effected, then, instead of the steps of hydrolyzing excess acetic anhydride with dilute acetic acid and the steps that follow it, the procedure is modified as follows: the hydrolysis of excess acetic anhydride is accomplished by treating the acetylation reaction mixture with a mixture of 1 liter of acetic acid (60% by weight) containing 10 cubic centimeters of concentrated hydrochloric acid, for a period of about six hours at a temperature of approximately 60° C. The mineral acid effects partial hydrolysis of the ester linkages, resulting in a partially hydrolyzed, partially etherified, partially esterified cellulose derivative, which is soluble in acetone to produce solutions of any desired degree of viscosity, depending upon the degree of deacetylization of the product, and which is soluble, also, in halogen-free solvent mixtures, for example, a mixture of methyl acetate, ethyl acetate and acetone.

The partially hydrolyzed, partially etherified, partially esterified product obtained in the manner described may be used in the manufacture of foils and films according to the so-called dry casting process. The foil or film products are obtained by conventional methods as when making foils or films of cellulose diacetate and the foils obtained are found to have a tensile strength of 7 to 8 kilograms per square millimeter, an elongation before rupture of about 10%, and, as compared to commercial grade cellulose diacetate, they absorb only half as much water, a property that it is possible to improve still further by use of suitable plasticizers, for example, one of the aryl phosphates.

This product is adapted, also, to use in the manufacture of injection molding compositions. For example, a composition of this type is obtained by kneading together a partially hydrolyzed, partially etherified, partially esterified product with about 30% by its weight of dimethylphthalate, in the presence of a small amount of methanol which subsequently is removed by distillation. The composition so obtained may be injection molded at temperatures up to 170° C. in the usual manner, the temperatures used being about 30° C. below those needed for injection molding of otherwise similar compositions made of cellulose diacetate, and the time required for softening the plastic to the degree needed for injection is about half that required for cellulose diacetate compositions. The tensile strength of a typical injection molded product formed of the novel plastic material according to this invention is about 5 to 6 kilograms per square millimeter and, due to its remarkably low absorption of water, its dimensional integrity is maintained even when wet.

Filaments of the partially hydrolyzed, partially etherified, partially esterified product above described may be made by the usual wet or dry spinning methods, using solutions of the product in acetone or another suitable solvent. The filaments so obtained, after drying, have a tensile strength of about 1.2 to 1.3 grams per denier and, because of the low water absorption of the material, about 80% to 90% of this strength is retained while the filaments are wet, in contrast to filaments of cellulose diacetate which retain merely 65% of their dry strength when wet. It is significant, also, that, when exposed to atmospheric conditions of high relative humidity up to about 65%, filaments of the new material absorb merely about 2% to 2.5% moisture, in contrast to cellulose diacetate filaments, which absorb about 6% by weight.

The following contrasted data are results of tests made upon films of 70 microns thickness, formed of a commercial grade cellulose diacetate and of a partially hydrolyzed, partially etherified, partially esterified cellulose, prepared as above described and containing about 44.3% by weight acetyl, 17.0% by weight dichlorodifluoroethyl and 1.6% by weight of hydroxyl groups. Except where otherwise indicated, the tests were performed at ordinary room temperatures and at a relative humidity of about 65%.

| | Fluorine-containing product film | Cellulose diacetate film |
|---|---|---|
| Tensile strength (kilograms per square millimeter) | 7.4 | 7.7 |
| Elongation before rupture_____percent__ | 7.8 | 5.7 |
| Number of alternate bendings before breaking | 37 | 35 |
| Water absorption at 100% humidity (percent) | 6.8 | 15.7 |

The following contrasted data are results of tests performed in an atmosphere of about 65% relative humidity upon filaments of about 4 denier thickness in each instance, formed of an ordinary commercial grade cellulose diacetate and, in the instance of the new product, dry-spun from a solution containing about 23% by weight of total weight of the partially hydrolyzed, partially acetylated, partially etherified substance obtained as above described, dissolved in a mixture of 93 parts by weight of acetone and 7 parts by weight of methanol.

| | Fluorine-containing product film | Cellulose diacetate film |
|---|---|---|
| Tensile strength (grams per denier): | | |
| Dry | 1.25 | 1.4 |
| Wet | 0.92 | 0.84 |
| Percentage of dry strength retained when wet | 75 | 60 |
| Elongation before rupture: | | |
| Dry_____percent__ | 25 | 30 |
| Wet_____do____ | 33 | 40 |
| Water absorption (percent) | 2.3 | 6 |

It will be understood by those skilled in the art to which this invention relates, from the foregoing data, that these new polymeric plastic products, obtained in the manner described above, are not pure chemical compounds of clearly established molecular structure as these terms usually and correctly are employed; instead, these polymeric products are long-chain polyhydroxy-compounds of uncertain constitution, which, for convenience, may be designated as mono-, di- or tri-substitution derivatives of cellulose, based on the averaged analytical data representative of the degree of involvement of the total hydroxyl groups present. With full recognition of these limitations, the products obtained according to the preceding examples may be assigned definite, descriptive names in recognized chemical terminology as follows:

| Example No. | Name of polymeric unit |
|---|---|
| 1 | Mononitrate of dichlorodifluoroethyl ether of cellulose. |
| 2 | Diacetate of dichlorodifluoroethyl ether of cellulose. |
| 3 | Monoacetate of dichlorodifluoroethyl ether of cellulose. |

EXAMPLE 4

*Preparation of monobutyral of dichlorodifluoroethyl ether of polyvinyl alcohol*

About 100 grams of polyvinyl alcohol (saponification number 20, viscosity of a 4 percent aqueous solution 28 centipoises) are suspended in 500 cubic centimeters of a 20 percent sodium hydroxide solution and, together with 50 grams of dichlorodifluoroethylene, are shaken for 48 hours at room temperature. The solid reaction product is filtered off, washed free of alkali and dried at 60° to 80° C. About 107 grams of white, powdery material are obtained which contains 11.7 percent of chlorine, corresponding to a halogen-ethyl content of 22 percent or about 0.1 mol per mol of polyvinyl alcohol.

About 55 grams of the thus obtained partial ether is suspended in 1000 cubic centimeters of water and converted to an acetal in known manner by adding 5 cubic centimeters of concentrated hydrogen chloride with 50 grams of n-butyraldehyde at 25 to 35° C. After 40 hours, the solid reaction product is filtered off, washed free of acid and dried. 83 grams of the acetal product, containing 8.8 percent of chlorine, is obtained.

The product is soluble in the solvents known for polyvinyl butyral and, in addition, may be dissolved to a certain extent in benzene and chlorinated hydrocarbons. It is excellently compatible with the conventional plasticizers.

Employing a 100 micron thick film free of plasticizer, the following comparative values are obtained. Except where otherwise indicated, the tests were performed at a relative humidity of 65%.

|  | Fluorine-containing product | Commercial polyvinyl butyral[1] |
|---|---|---|
| Tensile strength (kilograms per square millimeter) | 5.2 | 5.3 |
| Elongation before rupture_____percent | 12 | 8 |
| Number of alternate bendings before breaking | 39 | 37 |
| Water absorption at 100% humidity (percent) | 2.1 | 7.2 |

[1] The commercial product "Pioloform BS" of Wacker-Chemie G. m. b. H. (degree of acetal formation about 75%, viscosity of a 10 percent solution in acetic ester-methanol (1:3) 360 cp.).

What has been said at the end of Example 3 about the uncertainty of specific constitution of the cellulose derivatives obtained according to Examples 1 to 3 is also applicable to the polyvinyl alcohol ether acetal derivative of the last example.

What is claimed is:

1. As a new plastic substance, a dichlorodifluoroethyl ether of a polymeric polyhydroxy substance substantially free of unetherified hydroxyl groups and selected from the group consisting of cellulose lower aliphatic acid esters, cellulose nitrate and polyvinyl lower alkyl acetals.

2. As a new plastic substance, a dichlorodifluoroethyl ether, substantially free of unetherified hydroxyl groups, of a cellulose lower aliphatic acid partial ester.

3. As a new plastic substance, a dichlorodifluoroethyl ether, substantially free of unetherified hydroxyl groups, of a cellulose partial acetate.

4. As a new plastic substance, a cellulose diacetate dichlorodifluoroethyl ether.

References Cited in the file of this patent

UNITED STATES PATENTS

| 2,409,274 | Hanford | Oct. 15, 1946 |
| 2,433,844 | Hanford | Jan. 6, 1948 |